United States Patent Office 3,366,842
Patented Jan. 30, 1968

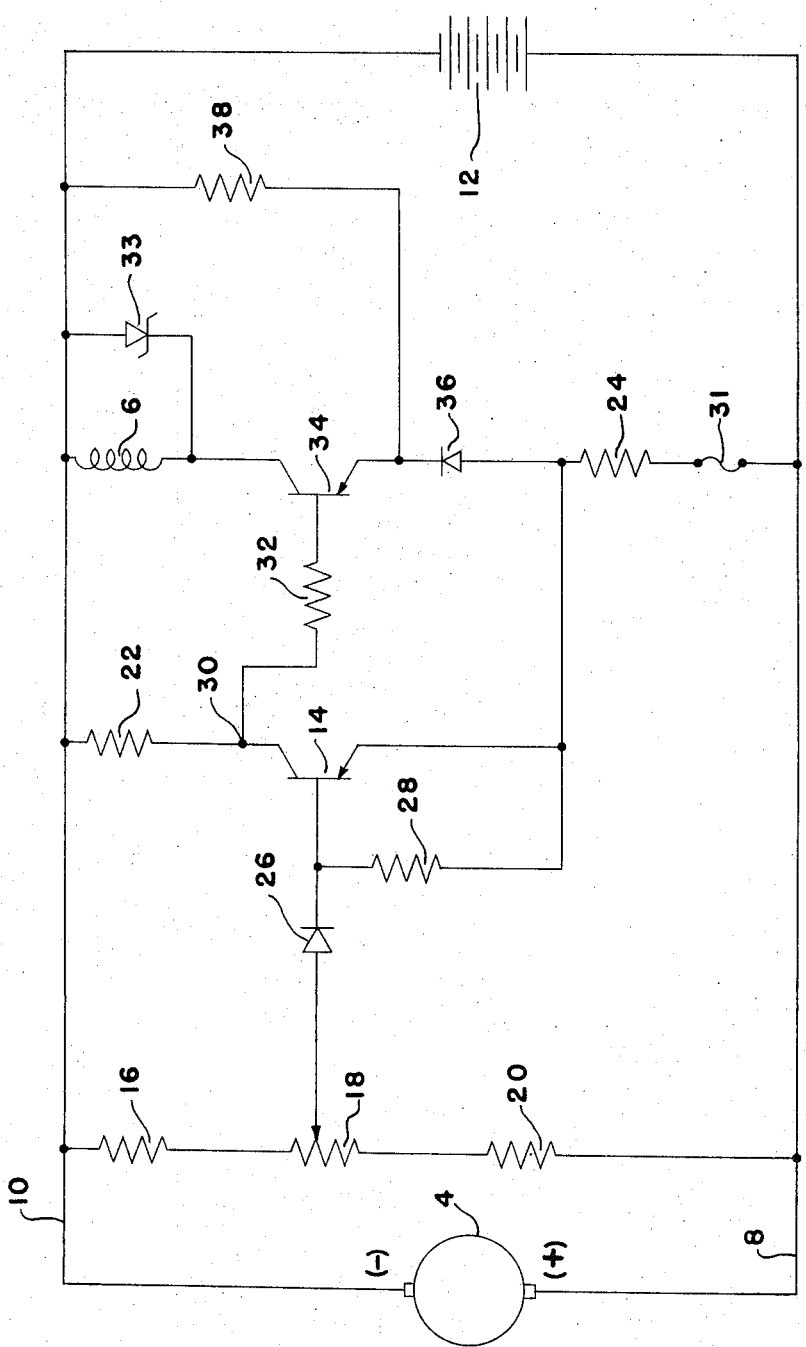

3,366,842
FAIL-SAFE VOLTAGE REGULATOR CIRCUIT
Johan Lund, Kokomo, Ind., assignor to General Motors Corporation, Detroit, Mich., a corporation of Delaware
Filed Mar. 4, 1965, Ser. No. 437,109
2 Claims. (Cl. 317—33)

ABSTRACT OF THE DISCLOSURE

A fail-safe voltage regulator circuit for use with an electric generator wherein a fuse, the current carrying electrodes of a field switching transistor and the generator field are connected in series across the output circuit thereof and a Zener diode is connected in shunt across the generator field. In the event the field switching transistor should fail by becoming short-circuited, thereby failing to interrupt the field energizing circuit, the resulting increase in potential magnitude across the output circuit would produce conduction through the Zener diode in the reverse direction. The Zener diode current flow added to the normal current flow would be of sufficient magnitude to cause the fuse to interrupt the field energizing circuit, thereby disenabling the generator.

---

The present invention relates to voltage regulators and, more specifically, to a voltage regulator circuit having a fail-safe feature.

In many electrical power sources, the output voltage is dependent upon the amount of current flow through a control winding or coil. To regulate the output voltage magnitude of sources of this type within tolerable maximum and minimum limits, a voltage regulator circuit which controls the amount of control winding current flow in response to changes in magnitude of output voltage is frequently employed.

To reduce the size and increase reliability, solid state components and circuitry may be used to replace the electromechanical devices formerly employed. Regulator circuits of this type usually include a controllable switching device, such as a transistor or other solid state component, connected in series with the control winding for determining the amount of current flow therethrough in response to a control voltage, produced by a voltage sensitive circuit arrangement, which varies with the output voltage.

The effect of a shorted controllable switch device or failure of the voltage sensitive circuitry to properly reduce current conduction through the controllable switch in circuits of this type is to increase the source output voltage. Therefore, a fail-safe feature which will interrrupt the control winding circuit and disenable the power source in response to source overvoltage conditions is desirable to prevent damage or destruction of associated circuitry and devices.

As the use of solid state components in regulating circuitry is becoming increasingly popular, the requirement of a circuit of this type having a reliable fail-safe feature is apparent.

Therefore, it is an object of this invention to provide an improved voltage regulator circuit.

It is an additional object of this invention to provide an improved voltage regulator circuit having a fail-safe feature.

It is a further object of this invention to provide an improved voltage regulator circuit having a reliable fail-safe feature which is sensitive to source overvoltage conditions to disenable the power source.

In accordance with this invention, a fail-safe voltage regulator circuit is provided wherein a current sensitive circuit interrupting device and a controllable control winding switching device are connected in series with the parallel combination of the power source control winding and a voltage sensitive circuit element across the output circuit of the source whereby source overvoltage conditions will produce conduction through the voltage sensitive element connected in parallel with the control winding thereby providing another path for current flow which, when added to the normal control winding current will be of sufficient magnitude to operate the current sensitive circuit interrupting device which opens the control winding circuit and disenables the power source.

For a better understanding of the present invention together with additional objects, advantages, and features thereof, reference is made to the following description and accompanying single figure drawing which sets forth the fail-safe regulator circuit of this invention in schematic form.

Without intention or inference of a limitation thereto, one example of a power source of this type is an automotive alternator or generator in which the output voltage is determined by the amount of current flow through the control winding which is generally referred to as the field winding.

There have been many solid state regulator circuits developed to regulate the output voltage of an automotive alternator or generator. One circuit of this type into which the novel fail-safe feature of this invention may be incorporated is disclosed and described in U.S. Patent 3,098,964, "Transistor Regulator and Generator," which issued to L. B. Hetzler on July 23, 1963, and is assigned to the same assignee as this application.

Referring to the drawing, the electrical power source may be an automotive diode rectified alternator or a commutator rectified generator having an armature 4 and a shunt field or control winding 6, as schematically indicated. It is to be specifically understood that the automotive alternator or generator electrical power source has been selected only to illustrate the novel features of this invention in this specification. It is not intended nor is it to be inferred that this invention be so limited as it is equally satisfactory for use with other power sources of the type having a control winding which varies the output voltage of the source in response to current flow therethrough.

The output terminals of armature 4 are connected to electrical leads 8 and 10 which comprise a two terminal direct current output circuit poled as indicated in the figure. This output circuit may be connected to charge a conventional storage battery 12, as shown, or it may be connected to other types of electrical loads, not shown.

Connected in series across the power source is a controllable control winding switching device, herein shown as transitor 34, a current sensitive circuit interrupting device, herein shown as a fuse 31, and the field or control winding 6 of the electrical power source. The controllable control winding switching device and the current sensitive circuit interrupting device have been herein indicated to be transistor 34 and a fuse 31, respectively, however, it is to be specifically understood that alternate controllable switching devices and current sensitive circuit interrupting devices may be used without departing from the spirit of this invention.

To produce a control voltage which is proportional to and varies with the source output voltage magnitude, a voltage sensing circuit comprising type PNP transistor 14 having the usual base, emitter and collector electrodes, the series combination of fixed resistor 16, variable resistor 18 and fixed resistor 20 and a sensing loop comprising Zener diode 26, the base-emitter circuit of transitor 14, as shunted by resistor 28, and fixed resistor 24 are connected across the output circuit of the power source. The collector and emitter electrodes of transistor 14 are connected to the negative and positive terminals of the output circuit through fixed resistors 22 and 24, respectively, while the base electrode is connected through Zener diode 26 to the movable contact of variable resistor 18.

The voltage applied across the sensing loop hereinabove described is that portion of the source output voltage across resistor 20 and variable resistor 18 as determined by the setting of the movable contact thereof. The resistance value of this loop is adjusted to provide a voltage drop of the same order of magnitude as the breakdown voltage of Zener diode 26 when the source output voltage is at the desired magnitude.

With an output voltage lower than the desired magnitude, no current flows in this loop as it is blocked by reversed biased Zener diode 26, therefore, transistor 14 is not conducting as there is no circuit for base-emitter current. With an output voltage higher than the desired magnitude, Zener diode 26 breaks down and conducts in the reverse direction, the base electrode of transistor 14 is biased more negative than the emitter thereof and base-emitter current flows through transistor 14 thereby triggering it to conduction.

The voltage at point 30, taken off the collector electrode of transistor 14, goes from a negative potential substantially equal to that of line 10 with transistor 14 not conducting in a direction more positive to a value as determined by the drop across resistor 24 as transistor 14 begins to conduct. As the conduction of transistor 14 is determined by the magnitude of output voltage, as set forth above, this control voltage present at point 30 varies with output voltage magnitude and is applied, through resistor 32, to the base or control electrode of the type PNP control winding switching transistor 34 having the usual base, emitter and collector electrodes.

With transistor 14 not conducting, the control voltage at point 30 is of a polarity which is more negative than the emitter electrode of transistor 34, a condition which satisfies the base-emitter bias requirements for conduction through a type PNP transistor, therefore, the base-emitter current through control winding switching transistor 34 triggers this device to conduction. As transistor 14 begins to conduct, the potential at point 30 moves in a positive direction thereby reducing the base bias of control winding switching transistor 34 and, with transistor 14 fully conductive, the potential at point 30 is more positive than the potential on the emitter electrode of control winding switching transistor 34 by a value equal to the voltage drop across diode 36, therefore, control winding switching transistor 34 is biased non-conductive. Therefore, transistor 14 serves as a variable resistance in shunt with control winding switching transistor 34 and produces the control voltage which is applied to the control electrode of control winding switching transistor 34.

Connected in shunt relationship with the field or control winding 6 is a potential sensitive circuit element which is characterized by the ability to become suddenly highly conductive when the voltage applied thereacross exceeds a predetermined magnitude as determined by the normal output voltage magnitude, herein shown as a Zener diode 33. That is, the predetermined voltage magnitude at which Zener diode 33 should conduct should be substantially equal to the normal output voltage magnitude. Therefore, the Zener diode selected should have a breakdown voltage characteristic of the same order of magnitude as the normal output voltage magnitude of the power source. It is to be specifically understood, however, that other devices possessing these characteristics may be employed without departing from the spirit of the invention.

The resistance value of conducting switching transistor 34, conducting diode 36, resistor 24 and current sensitive circuit interrupting device 31 is of a comparatively low value, therefore, the voltage drop across field or control winding 6 is substantially equal to the magnitude of the source output voltage. Therefore, Zener diode 33 may be connected in a shunt relationship with only field or control winding 6, a connection which provides a field discharge diode which suppresses transients upon the collapse of the field coil magnetic field without the inclusion of an additional circuit element. Zener diodes act as ordinary diodes when biased in the forward direction, as would be the case in the event of the collapse of the magnetic field or winding 6. However, should the resistance value of the series conducting transistor 34, diode 36, resistor 24 and circuit interrupting device 31 be high enough to produce a significant voltage drop thereacross, the predetermined voltage magnitude at which Zener diode 33 will break down and conduct in the reverse direction may be of a value less than the desired source output potential by an amount equal to the drop across these series elements.

With source overvoltage conditions which exceed the predetermined magnitude of the breakdown voltage of Zener diode 33, this element conducts suddenly and heavily in the reverse direction, thereby establishing a parallel current path. The current flow through this path added to the current flow through the control or field winding 6 and conducting field winding switching transistor 34 is of sufficient magnitude to operate the current sensitive circuit interrupting device or fuse 31. When this device operates, the control or field winding circuit is interrupted and the power source is disenabled.

While a preferred embodiment of the novel features of this invention has been shown and described, it will be obvious to those skilled in the art that various modifications and substitutions may be made without departing from the spirit of the invention which is to be limited only within the scope of the appended claims.

What is claimed is as follows:

1. A fail safe voltage regulator circuit for disenabling a power source of the type having a control winding which varies the output voltage of said source in response to current flow therethrough and direct current output circuitry comprising, a transistor switching device having at least base, emitted and collector electrodes, a current sensitive circuit interrupting device, electrical circuit means for connecting said control winding, the emitter-collector electrodes of said transistor switching device and said current sensitive circuit interrupting device in series circuit relationship across said direct current output circuitry, a voltage sensing circuit for developing a control voltage proportional to the magnitude of the output voltage connected across said direct current output circuitry, circuit means for applying said control voltage to the base electrode of said transistor switching device for controlling the conduction of said transistor switching device inversely in response to changes in direct current voltage magnitude across said direct current output circuitry and a potential sensitive circuit element characterized by the ability to become suddenly highly conductive when the voltage applied thereacross exceeds a predetermined magnitude as determined by the normal output voltage magnitude of said source connected in shunt relationship with said control winding whereby the current flow therethrough upon conduction with source overvoltage conditions added to the current flow through said control winding is of sufficient magnitude to operate said current sensitive circuit interrupting device thereby opening said control winding circuit and disenabling said power source.

2. A fail safe voltage regulator circuit for disenabling a power source of the type having a control winding which varies the output voltage of said source in response to current flow therethrough and direct current output circuitry comprising, a transistor switching device having at least base, emitted and collector electrodes, a current sensitive circuit interrupting device, electrical circuit means for connecting said control winding, the emitter-collector electrodes of said transistor switching device and said current sensitive circuit interrupting device in series circuit relationship across said direct current output circuitry, a voltage sensing circuit for developing a control voltage proportional to the magnitude of the output voltage connected across said direct current output circuitry, circuit means for applying said control voltage to the base electrode of said transistor switching device for controlling the conduction of said transistor switching device inversely in response to changes in direct current voltage magnitude across said direct current output circuitry and a Zener diode device having a breakdown voltage characteristic of a magnitude as determined by the normal output voltage magnitude of said source connected in shunt relationship with said control winding whereby the current flow therethrough upon conduction with source overvoltage conditions added to the current flow through said control winding is of sufficient magnitude to operate said current sensitive circuit interrupting device thereby opening said control winding circuit and disenabling said power source.

References Cited
UNITED STATES PATENTS 2,925,548  2/1960  Scherer.
3,121,837  2/1964  Holm et al. _____ 322—28

MILTON O. HIRSHFIELD, *Primary Examiner.*

R. V. LUPO, *Assistant Examiner.*